(12) United States Patent
Meador et al.

(10) Patent No.: US 6,262,223 B1
(45) Date of Patent: Jul. 17, 2001

(54) TRIAMINE-MODIFIED POLYMIDES HAVING IMPROVED PROCESSABILITY AND LOW MELT FLOW VISCOCITY

(75) Inventors: Michael A. Meador, Strongsville; Baochau N. Nguyen, North Royalton; Ronald K. Eby, Akron, all of OH (US)

(73) Assignee: The United States of America as represented by the Administrator of National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 09/495,599

(22) Filed: Feb. 1, 2000

Related U.S. Application Data

(60) Provisional application No. 60/118,479, filed on Feb. 3, 1999.

(51) Int. Cl.[7] .......................... C08G 73/10; C08G 69/26
(52) U.S. Cl. ..................... 528/353; 528/125; 528/126; 528/128; 528/170; 528/172; 528/173; 528/176; 528/179; 528/183; 528/188; 528/220; 528/229; 528/272; 528/322; 528/342; 528/347; 528/350; 528/351; 525/422; 525/435; 525/436; 524/600; 524/606; 428/441.1
(58) Field of Search ................................ 528/353, 220, 528/229, 125, 128, 172, 173, 179, 176, 183, 186, 272, 322, 342, 350, 351, 126, 347; 524/600, 606; 525/422, 435, 436; 428/411.1

(56) References Cited

U.S. PATENT DOCUMENTS

| | | | |
|---|---|---|---|
| 5,132,395 | * | 7/1992 | Serafini et al. ............... 528/353 |
| 5,145,937 | * | 9/1992 | Herfenrother et al. ......... 528/125 |
| 5,149,760 | * | 9/1992 | Serafini et al. ............... 528/353 |
| 5,149,772 | * | 9/1992 | Serafini et al. ............... 528/353 |
| 5,412,066 | * | 5/1995 | Hergenrother et al. ........ 528/353 |
| 5,428,102 | * | 6/1995 | St. Clair et al. .............. 528/353 |
| 5,461,137 | * | 10/1995 | Serafini et al. .............. 528/353 |
| 5,461,138 | * | 10/1995 | Serafini et al. .............. 528/353 |
| 5,478,916 | * | 12/1995 | Chang et al. ................. 528/353 |
| 5,866,676 | * | 2/1999 | Gensen ......................... 528/185 |
| 5,965,687 | * | 10/1999 | Gensen ......................... 528/330 |

OTHER PUBLICATIONS

"High Temperature Polymer Matrix Composites for Extreme Environments" by Meador et al.
*American Chemical Society* "Modified Phenylethynyl Terminated polyimides with Lower Melt Viscosity" by B. Jensen vol. 37, No. 2, pp. 222–223, Aug. 1996.
*Macromolecules* "Star and Linear Imide Oligomers Containing Reactive End Caps: Preparation and Thermal Properties" by Takeichi et al., vol. 19, No. 8, Aug. 1996.
"Thermosetting Polyimides: A Review" Sample Journal, vol. 30, No. 5, pp. 29–38, Sep./Oct. 1994.

* cited by examiner

Primary Examiner—P. Hampton-Hightower
(74) Attorney, Agent, or Firm—Kent N. Stone

(57) ABSTRACT

Addition-cured polyimides that contain the reaction product of an aromatic triamine or trianhydride analogue thereof, a reactive end group such as 5-norbornene-2, 3-dicarboxylic acid, ester derivatives of 5-norbornene-2,3-dicarboxylic acid, anhydride derivatives of 5-norbornene-2,3-dicarboxylic acid, or 4-phenylethynylphthalic anhydride, an aromatic diamine, and a dialkyl ester of an aromatic tetracarboxylic acid. The resultant starlike polyimides exhibit lower melt flow viscosity than its linear counterparts, providing for improved processability of the polyimide. Also disclosed are methods for the synthesis of these polyimides as well as composite structures formed using these polyimides.

17 Claims, 12 Drawing Sheets

| Optimized | Staging time (hr.) | Staging temp (F) | %TAB | FMW | %DMBZ | SFI (cm²/g) | $T_g$ (°C) | TOS |
|---|---|---|---|---|---|---|---|---|
| SFI | 0.50 | 400.05 | 4.6316 | 1531.3 | 0.0065 | 220.76 | 313.50 | 11.976 |
|  | 0.52 | 400.03 | 15.949 | 1500.0 | 100 | 109.38 | 361.20 | 6.899 |
|  | 0.50 | 405.53 | 0 | 1588.6 | 0.0004 | 211.32 | 307.65 | 10.894 |
| $T_g$ | 1.50 | 450.00 | 19.992 | 1501.3 | 0 | 143.52 | 328.43 | 8.384 |
|  | 1.14 | 400.01 | 15.575 | 1500.6 | 99.998 | 108.54 | 359.65 | 5.896 |
| Weight Loss after 750 h at 288°C | 1.50 | 433.31 | 6.971 | 4025.3 | 0 | 60.65 | 289.17 | 4.931 |
|  | 0.94 | 400.00 | 0.843 | 3794.4 | 99.656 | 38.72 | 338.02 | 2.224 |

Fig. 10

TRIAMINE-MODIFIED POLYMIDES HAVING IMPROVED PROCESSABILITY AND LOW MELT FLOW VISCOCITY

This application claim benefit to provisional application 60/118,479 Feb. 3, 1999.

The invention described herein was made by an employee and contractors of the U.S. Government and may be manufactured and used by or for the Government for governmental purposes without the payment of any royalties thereon or therefor.

TECHNICAL FIELD

This invention relates to the incorporation of aromatic triamine in addition—cured polyimides containing nadic or 4-phenylethynylphthalic anhydride reactive end groups such that the resulting polyimides can be further processed using compression molding, autoclave molding or resin transfer molding techniques. The resulting, star-branched polyimides exhibit a higher glass transition temperature, increased thermo-oxidative stability (TOS) and a lower melt flow viscosity as compared to their "linear" counterparts, making the polyimide matrix resin easier to process and, therefore, suitable for the formation of composites using resin transfer molding processing techniques. Methods for the synthesis of these polyimides as well as composite structures formed using these polyimides are also disclosed.

BACKGROUND OF THE INVENTION

Thermosetting polyimides are easier to process than their thermoplastic counterparts in that they use low molecular weight, low viscosity monomers and/or prepolymers as starting materials in their synthesis. These thermosetting polyimides' superior processability combined with their high temperature capabilities make them increasingly more attractive for use as high performance matrix resins in typically lightweight, structurally efficient fiber reinforced polymer matrix composites. Such polymer matrix composites are finding increased use in, inter alia, the electronics, automobile and aerospace industries.

Addition-cured thermosetting polyimides are typically classified by the chemical nature of their reactive endgroups. Currently, there are at least three general types of polyimides, (1) PMR-type polyimides, (2) acetyleneterminated polyimides and (3) bismaleimides, although some polyimides may not fall under any of these types.

Bismaleimides are relatively easily processable using various molding techniques, including compression molding, autoclave molding and resin transfer molding, but do not possess the high temperature stability associated with the other two types of polyimides. Bismaleimides are popular, however, for use in the temperature range of 150–250° because of their epoxy-like processing and polyimide-like temperature capability.

In comparison to the bismaleimides, acetylene-terminated polyimides exhibit higher glass transitions temperatures and increased thermo-oxidative stability. However, the acetylene-terminated polyimides are extremely difficult to process and, therefore, are not suitable for many applications due to the high cost involved during processing.

In 1972, an improved process, known as in-situ Polymerization of Monomer Reactants (PMR) for polyimide composite fabrication was developed by NASA. The PMR process essentially comprises dissolving a monoalkyl ester of 5-norbornene-2,3-dicarboxylic acid, also known as nadic ester (NE), an aromatic diamine, and a dialkyl ester of an aromatic tetracarboxylic acid in a low-boiling alkyl alcohol such as methanol or ethanol. The monomeric solution is used to impregnate other components such as reinforcing fibers, with in-situ polymerization through the nadic ester end group occurring directly on the fiber surfaces, producing a composite material with excellent thermal and mechanical properties. Attractive features of the PMR process include a) the use of low molecular weight, low viscosity monomers; b) the use of a low-boiling solvent; and c) little or no evolution of volatile materials during the final curing step. Thus, in comparison with the bismaleimides and the acetylene-terminated polyimides, the PMR-type polyimides are easy to process and exhibit high glass transition temperature and high temperature stability.

Unfortunately, these PMR-type polyimides are linear addition-cured polyimides which exhibit high melt flow viscosities of at least 100,000 centipoise that limit their processing to techniques involving hand lay-up of the prepreg followed by autoclave or compression molding. That is, resin transfer molding techniques cannot be used with these linear addition-cured polyimides. Use of these other processing techniques are extremely labor intensive and results in high manufacturing costs for components made with linear addition-cured polyimides. It will be appreciated that the term "linear" for the linear additioncured polyimides refers to the general configuration of the polyimides as extending in only two directions.

Thus, the need exists for a PMR-type polyimide that exhibits a lower melt flow viscosity than known PMR-type polyimides. Such a PMR-type polyimide is believed to be more easily processable and, potentially, capable of being processed using low cost molding techniques such as resin transfer molding.

A significant benefit of using the PMR approach in the production of polyimides is that, for a given set of monomer reactants, a series of PMR-type polyimides can be formulated simply by changing the molar ratio of each monomer reactant. For example, the molecular weight of the typical linear PMR-type polyimide can be varied depending upon the ratio of the monomer reactants by selecting the molecular weight (n) of the diester diacid or the molecular weight of the diamine (n+1). The molar ratio of the nadic end group will always be 2 in these linear addition-cured polyimides. Thus, the ratio of end group:diamine: diester diacid will be 2:n+1:n. In theory, the formulated molecular weight of the polyimide will determine its crosslink density and is, therefore, thought to be an important parameter controlling the processing characteristics, physical and mechanical properties of a PMR-type polyimide.

Significant strides have been made in the production of polyimides having improved mechanical properties and high temperature stability and performance. For example, Takeichi and Stille have prepared biphenylene and acetylene end-capped imide oligomers by adjusting the stoichiometry of the monomers 3,3',4,4'-benzophenone tetracarboxylic dianhydride and 4,4'-diaminophenyl ether and the endcapping monomers (3- or 4-aminophenyl) acetylene or 2-aminobiphenylene. Star-branched imide oligomers having biphenylene or acetylene end groups were also prepared by utilizing 1,3,5-tris(4-aminophenoxy)benzene as the core of the star. Studies have shown that melt processed films of these star prepolymers exhibit better mechanical properties than films of their linear counterparts. For a more detailed account of these findings, see Takeichi, T. and Stille, J. K., Macromolecules, "Star and Linear Imide Oligomers Containing Reactive End Caps: Preparation and Thermal Properties", 19(8), 2093–2102, (1986), the disclosure of which is incorporated herein by reference. It will be appreciated, however, that Takeichi and Stille did not employ the PMR process and, thus, processability problems remain.

Similarly, strides have also been made in the synthesis of certain other addition-cured polyimides which improve various properties. For example, Jensen uses 4-phenylethynylphthalic anhydride as a reactive end cap and forms an addition-cured polyimide by dissolving n units of diamine, 2 units of triamine, namely triamino pyrimidine, n+1 units of a dianhydride, namely 3,4'-oxydianiline, and 4 units of the phenylethynylphthalic anhydride reactive end group in N-methylpyrrolidinone (NMP). For a more detailed discussion on this reaction, see Jensen, B. J., *Polym. Prepr.*, "Modified Phenylethynyl Terminated Polyimides with Lower Melt Viscosity" 37(2) 222–23 (1996), the disclosure of which is incorporated herein by reference. The polyimide suffers from the fact that upon imidization of one of the amine groups in the triamine, the reactivity of the other two amines is diminished substantially.

Moreover, it will be appreciated that, while the art has provided improvements to acetylene-terminated polyimides and to other "linear" polyimides, the art has not provided heretofore a manner in which to improve the processability of PMR-type polyimides to the extent that these polyimides would be suitable for processing using various molding techniques including resin transfer molding.

SUMMARY OF INVENTION

It is, therefore, an object of the present invention to provide an addition-cured polyimide containing nadic or 4-phenylethynylphthalic anhydride reactive end caps.

It is another object of the present invention to provide a star-branched, addition-cured polyimide by incorporating an aromatic triamine as the core.

It is yet another object of the present invention to provide a star-branched, addition-cured polyimide that exhibits improved processability and a lower melt flow viscosity than its linear counterparts.

It is a further object of the present invention to provide a method for the synthesis of a star-branched, addition-cured polyimide containing nadic or 4-phenylethynylphthalic anhydride reactive end caps.

It is yet a further object of the present invention to provide a polymer matrix composite from the star-branched, addition-cured polyimide resin of the present invention.

It is still a further object of the present invention to provide a polymer matrix composite which is suitable for processing using resin transfer molding techniques.

At least one or more of the foregoing objects, together with the advantages thereof over the known art relating to addition-cured polyimides, which shall become apparent from the specification which follows, are accomplished by the invention as hereinafter described and claimed.

In general, the present invention provides an addition-cured polyimide comprising the reaction product of an aromatic triamine, a reactive end group selected from the group consisting of nadic, including its ester or anhydride derivatives thereof, and 4-phenylethynylphthalic anhydride, an aromatic diamine, and a dialkyl ester of an aromatic tetracarboxylic acid. The molar ratio of the components of triamine, reactive end group, diamine, and dialkyl ester of an aromatic tetracarboxylic acid is preferably 2/3X(n+1):2:(1−X)(n+1):n, respectively, where X is the percentage of triamine in the total amine mixture and n is a selected number of repeating monomer units of the specified monomer reactants. The resultant star-like polyimide exhibits lower melt flow viscosity than its linear counterparts, providing for improved processability of the polyimide.

The present invention also includes a method for the synthesis of an addition-cured polyimide comprising dissolving an aromatic triamine, a dialkyl ester of an aromatic tetracarboxylic acid, an aromatic diamine, and a reactive end group selected from the group consisting of nadic, including its ester or anhydride derivatives thereof, and 4-phenylethynylphthalic anhydride, in a low-boiling alkyl alcohol; and imidizing the resultant product with heat. More particularly, the resultant star-branched, addition-cured polyimide may be prepared by mixing the aromatic triamine and the dialkyl ester of the tetracarboxylic acid first, thereby generating the "core" of the star first, or by mixing the aromatic diamine and the dialkyl ester of the tetracarboxylic acid first, thereby generating the "arms" of the star first.

The present invention further includes a polymer matrix composite comprising the star-branched, addition-cured polyimide described hereinabove. Unlike other composites containing addition-cured polyimides containing nadic or 4-phenylethynyl-phthalic anhydride end groups, this composite may be prepared using resin transfer molding techniques.

BRIEF DESCRIPTION OF THE DRAWINGS

FIG. 10 is a table of chemical and/or physical properties for a number of polyimides formed from the reaction components set forth in FIG. 1, the properties including melt viscosities, measured by the squeeze flow index of the product (in sq. cm), glass transition temperatures, measured by DMA (2.5° C./min), and thermo-oxidative stabilities (TOS), measured by percent oxidative weight loss.

PREFERRED EMBODIMENT FOR CARRYING OUT THE INVENTION

As noted hereinabove, the present invention is directed toward the use of an aromatic triamine compound in conjunction with a diester diacid compound, i.e., an alkyl ester of a tetracarboxylic acid, an aromatic diamine compound, and a monoalkyl ester or anhydride derivative of 5-norbornene-2,3-dicarboxylic acid (nadic) or 4-phenylethynylphthalic anhydride (PEPA), to form a star-branched, addition-cured polyimide exhibiting an increase in glass transition temperature and thermo-oxidative stability (TOS) and a lower melt flow viscosity as compared to other "linear" PMR-type or addition-cured polyimides of comparable molecular weight. It will be appreciated that, for the purposes of this invention, the term "PMR-type polyimides" will generally refer to those "linear" polyimides prepared from a process using nadic ester end caps as discovered by NASA in the early 1970s. However, from time to time, the term "PMR-type polyimides may be used to refer to the polyimide of the present invention containing nadic ester or related derivatives thereof.

Figure 1:
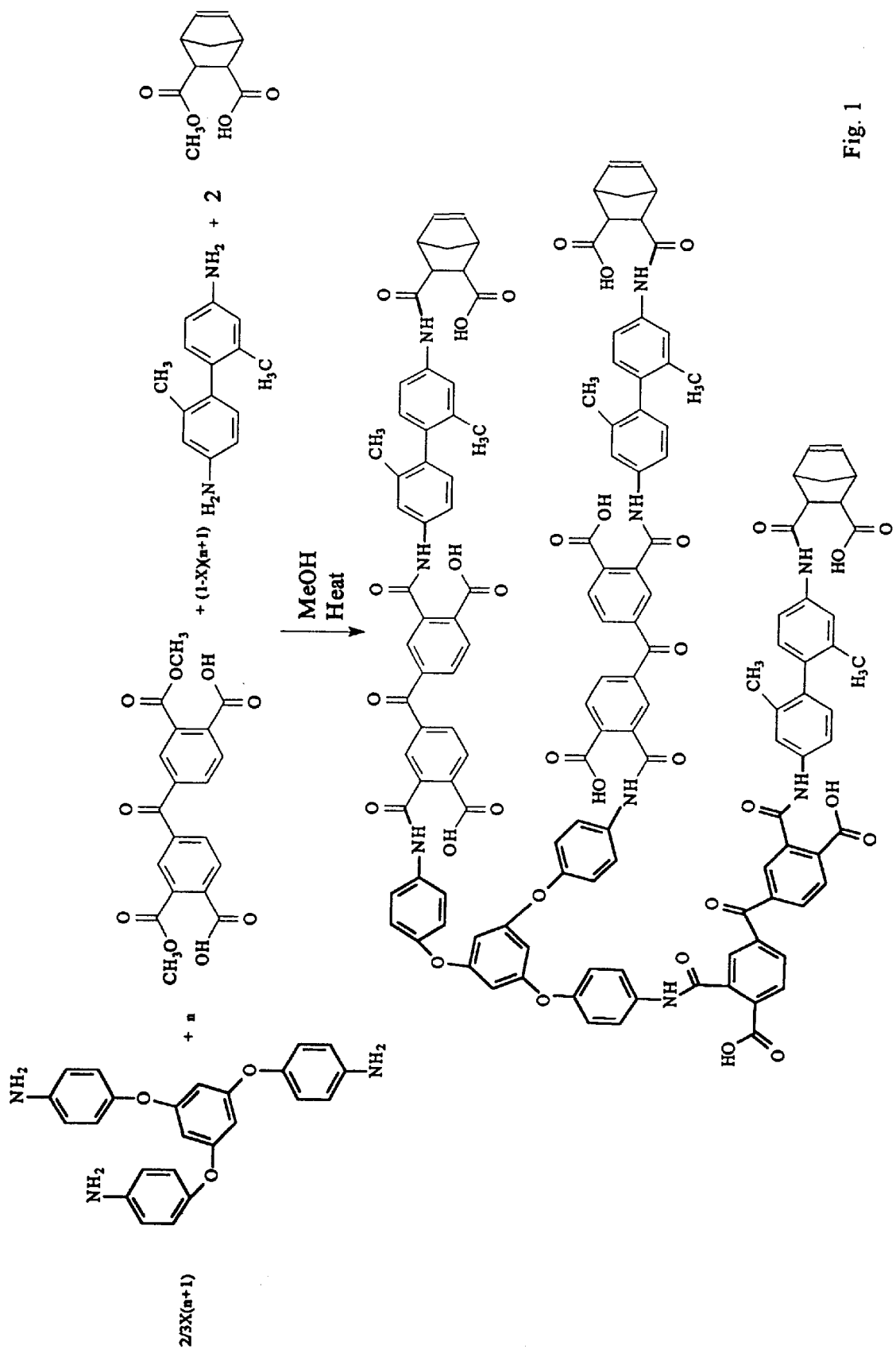
FIG. 1 is a general chemical reaction scheme for the present invention showing molar ratios for the components thereof.
Figure 1A:
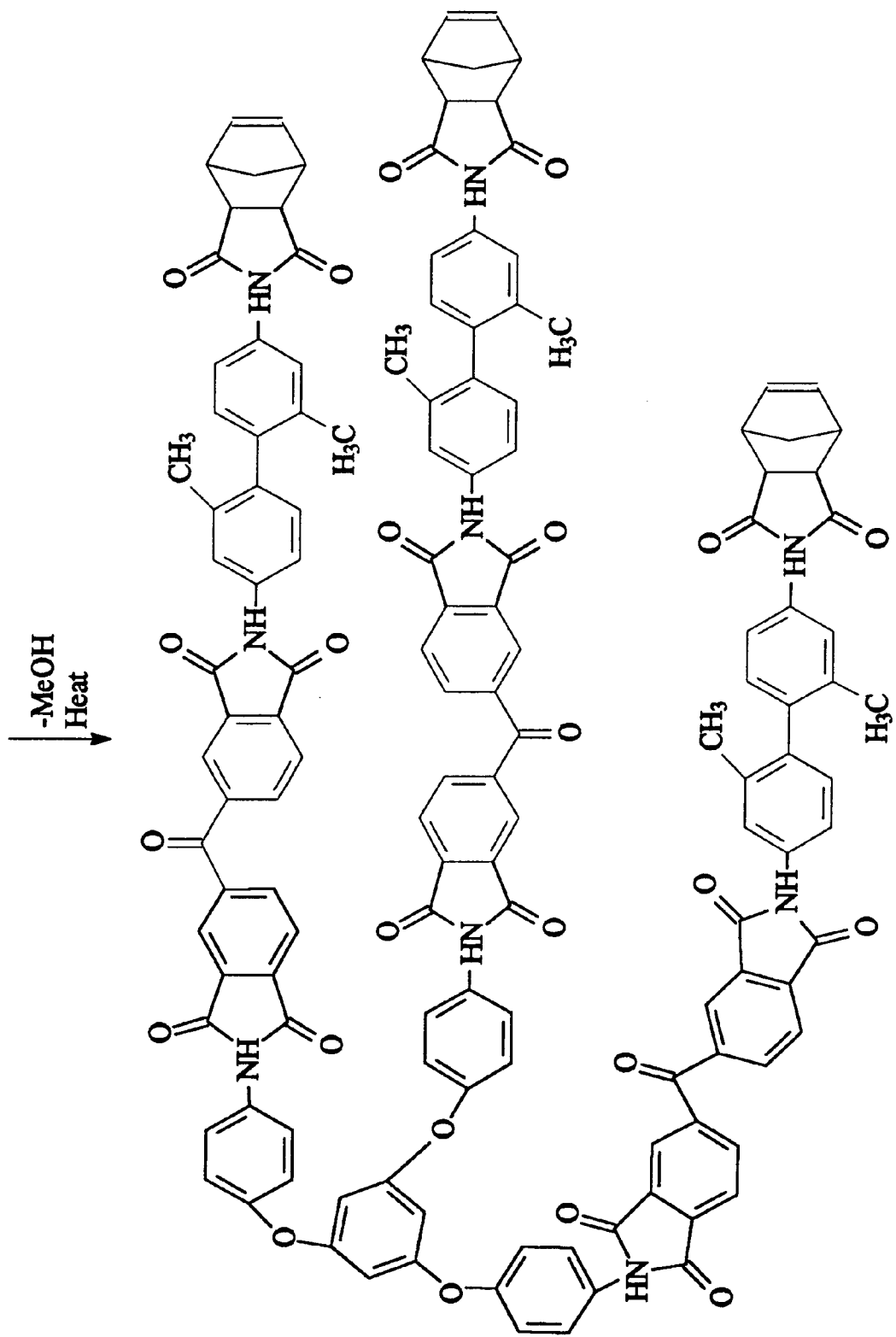
FIG. 1A is a continuation of the chemical reaction scheme of FIG. 1 showing the imidization reaction forming the polyimide.

As more particularly shown in FIG. 1, the polyimide of the present invention generally comprises the reaction product of 2/3X(n+1) moles of aromatic triamine, n moles of a dialkyl ester of an aromatic tetracarboxylic acid, (1−X)(n+1) moles of an aromatic diamine, and 2 moles of a reactive end group selected from the group consisting of nadic, including its ester or anhydride derivatives thereof, and 4-phenylethynylphthalic anhydride, wherein X is the percentage of triamine in the total amine compound and n is a selected number of repeating monomer units of the specified monomer reactants. In FIG. 1, n=1. Theoretically, the molecular weight of the polymer can be formulated since the theoretical n equals the theoretical molecular weight of the monomer reactant. The initial result of the reaction forms poly(amic acid) (FIG. 1) which, upon further moderate heating, undergoes cyclodehydration to produce the subject polyimide. (FIG. 1A).

Figure 2:
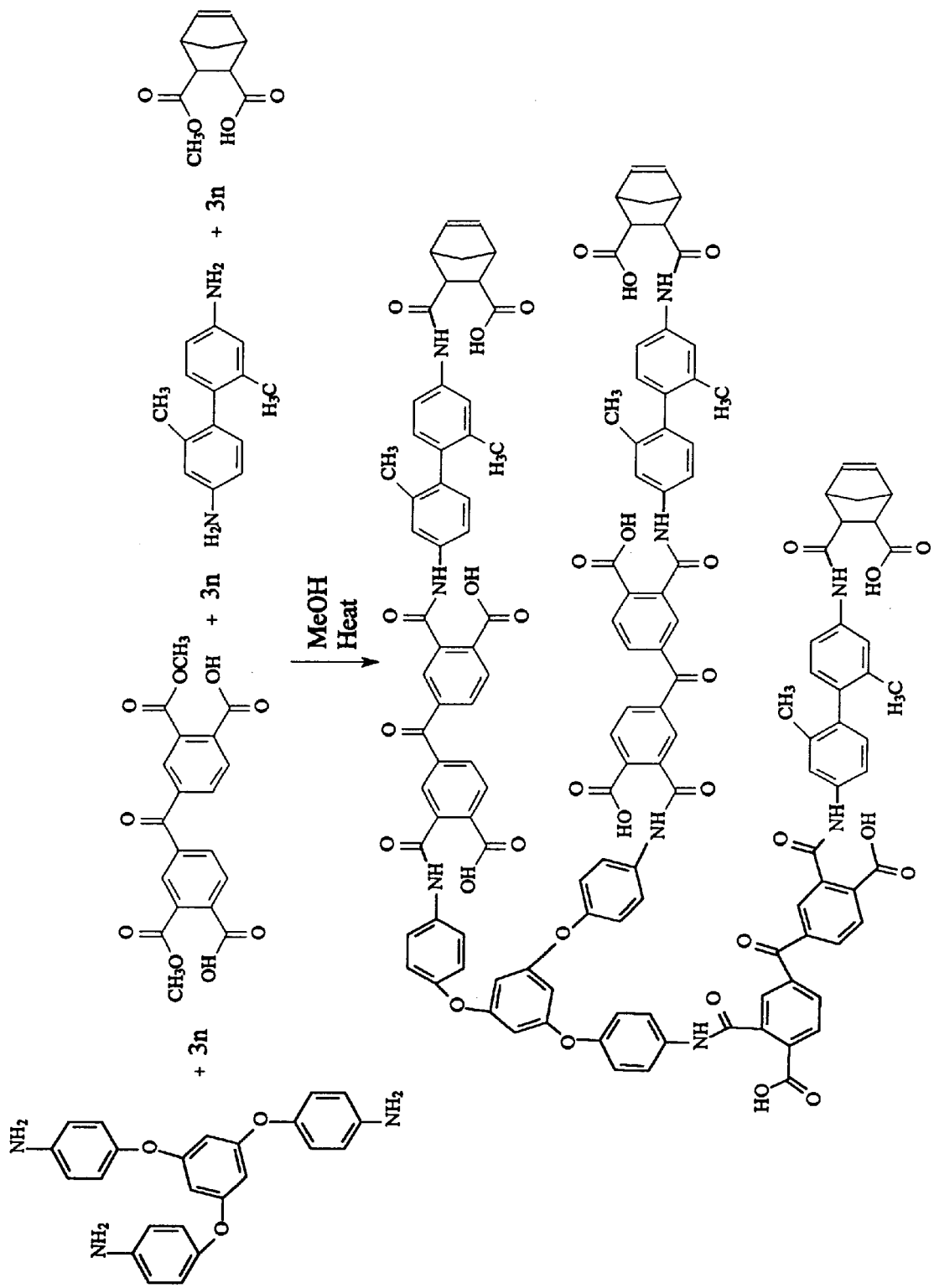
FIG. 2 is a more specific chemical reaction scheme for the present invention showing alternative select molar ratios for the components thereof.
Figure 2A:
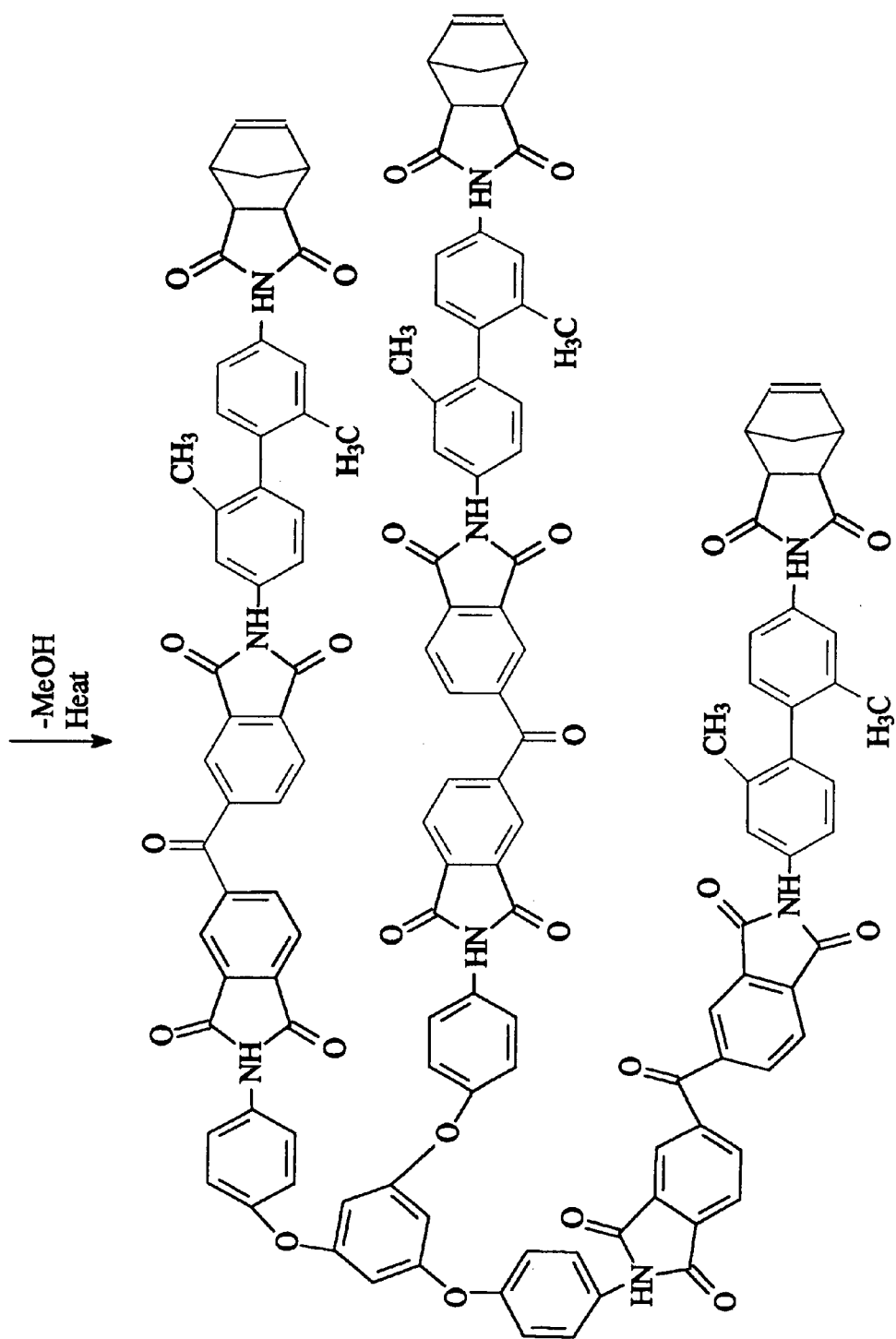
FIG. 2A is a continuation of the chemical reaction scheme of FIG. 2 showing the imidization reaction forming the polyimide.

As an alternative subset of the reaction set forth in FIG. 1, FIG. 2 shows the polyimide of the present invention as comprising the reaction product of 1 mole of aromatic triamine, 3 n moles of a dialkyl ester of an aromatic tetracarboxylic acid, 3 n moles of an aromatic diamine, and 3 moles of a reactive end group selected from the group consisting of nadic, including its ester or anhydride derivatives thereof, and 4-phenylethynylphthalic anhydride, wherein n is a selected number of repeating monomer units of the specified monomer reactants. In FIG. 2, n also equals 1. Again, theoretically, the molecular weight of the polymer can be formulated since the theoretical n equals the theoretical molecular weight of the monomer reactant. The initial result of the reaction forms poly(amic acid) (FIG. 2) which, upon further moderate heating, undergoes cyclodehydration to produce the subject polyimide. (FIG. 2A).

Essentially any aromatic triamine is believed to be suitable for the present invention. However, particularly useful in the present invention are those aromatic triamines of the chemical structure:

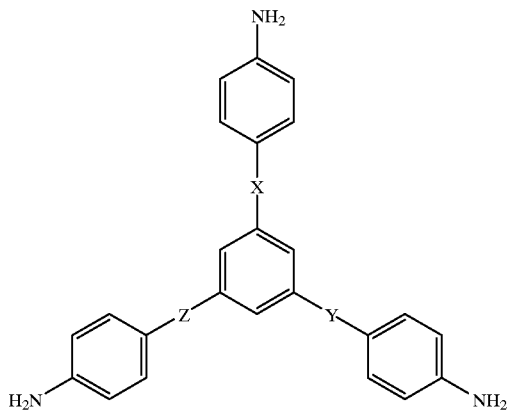

wherein X, Y, and Z are the same or different and selected from the group consisting of nil, O, $CH_2$, and C=O, and trianhydride analogues thereof. Most preferred among these aromatic triamines is 1,3,5,-tris(4-aminophenoxy) benzene (X, Y, Z,=O). Other preferred aromatic triamines include α,α',α"-tris(4-aminophenyl) mesitylene, 1,3,5-tris(4-aminobenzoyl)benzene, and 1,3,5-tris(4-aminophenyl) benzene. Synthesis of these aromatic triamines are well known in the art and at least one has been reported in Takeichi, T. and Stille, J. K., Macromolecules, "Star and Linear Imide Oligomers Containing Reactive End Caps: Preparation and Thermal Properties", 19(8), 2093–2102, (1986), the disclosure of which is incorporated herein by reference. In general, 1,3,5-trihydroxybenzene dihydrate, 4-fluoronitrobenzene, and potassium fluoride are dissolved in dimethyl sulfoxide (DMSO) and heated to reflux temperature for 30 minutes, generating 1,3,5-tris(4-nitrophenoxy)benzene. Various methods for then converting the 1,3,5-tris(4-nitrophenoxy) benzene to 1,3,5-tris(4-aminophenoxy) benzene are well known in the art.

The polyimide of the present invention also requires a dialkyl ester of a aromatic tetracarboxylic acid or a derivative thereof, such as the dihydride thereof or a tetracid thereof. This component may also be referred to throughout the specification as a diester diacid. Essentially any commercially available diester diacid having the properties desired may be used. However, a particularly preferred dialkyl ester of aromatic tetracarboxylic acid is the dimethyl ester of 3,3'4,4'-benzophelonetetracarboxylic acid (BTDE) shown below.

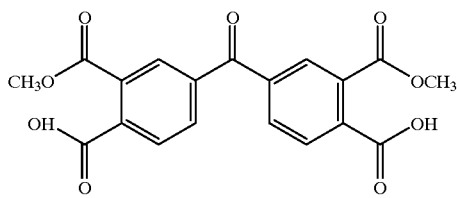

BTDE is often used in the production of the linear PMR-type polyimides such as described in Pater, R. H., *SAMPE Journal,* "Thermosetting Polyimides: A Review," 30(5), 29–38, (September/October 1994), the entire disclosure of which in incorporated herein by reference.

An aromatic diamine is also required to form the polyimide of the present invention. Again, essentially any aromatic diamine suitable for the purposes of the present invention may be employed. Particularly preferred are those diamines selected from the group consisting of

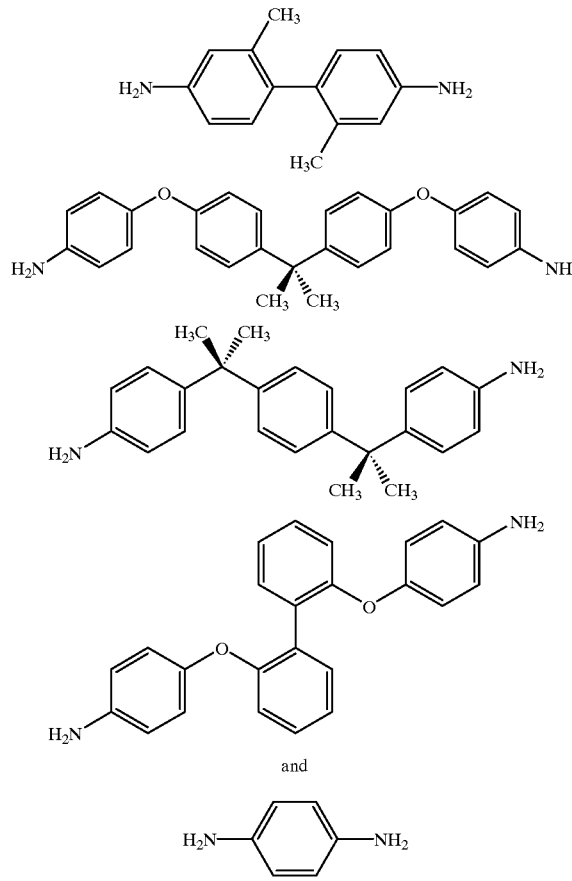

These diamines are more particularly 2,2'-dimethylbenzidine, 2,2'-Bis(4-aminophenoxy) propane, α,α'-bis(4-aminophenyl)p-xylene, Bisaniline P, and p-phenylene diamine.

Finally, the prepared polyimides of the present invention require a reactive end group selected from the group consisting of nadic, preferably the monomethyl ester of 5-norbornene-2,3-dicarboxylic acid (NE) as shown herein below or the anhydride derivative thereof, and 4-phenylethynylphthalic anhydride (PEPA), also shown below.

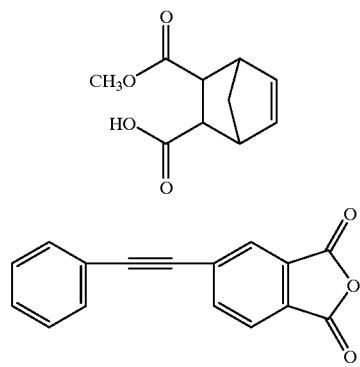

At this point, it will be appreciated that mixtures of the reactive end groups and unreactive end groups may be employed. That is, unreactive end groups such as monoalkyl ester derivatives of or anhydride derivatives of various aromatic ortho diacids may be used. A particularly suitable aromatic ortho diacid is phthalic acid. It will be appreciated that, while these unreactive end groups do not affect the addition cured reaction process, they often tend to aid or provide improvement in melt flow or other properties of the resultant polyimide.

Figure 3:
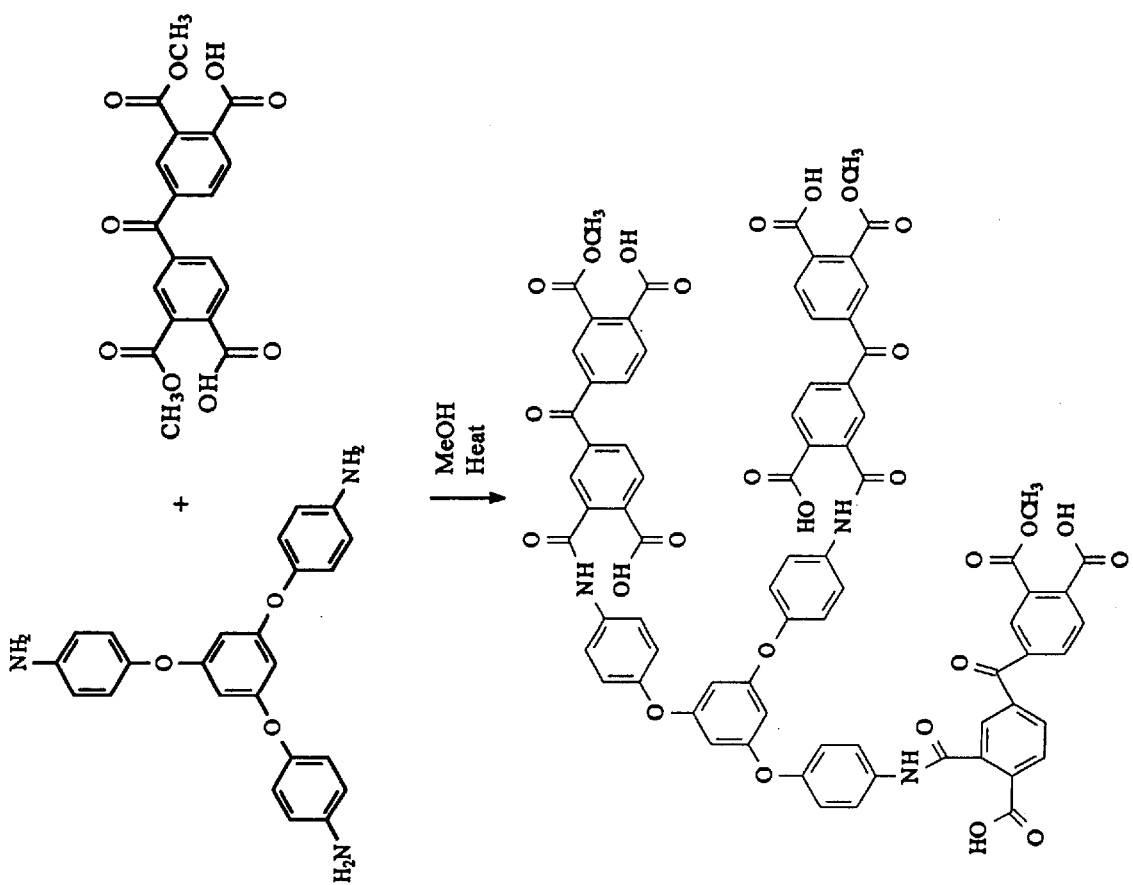
FIG. 3 is a chemical reaction scheme depicting the generation of the core of the polyimide prepolymer star first.
Figure 5:
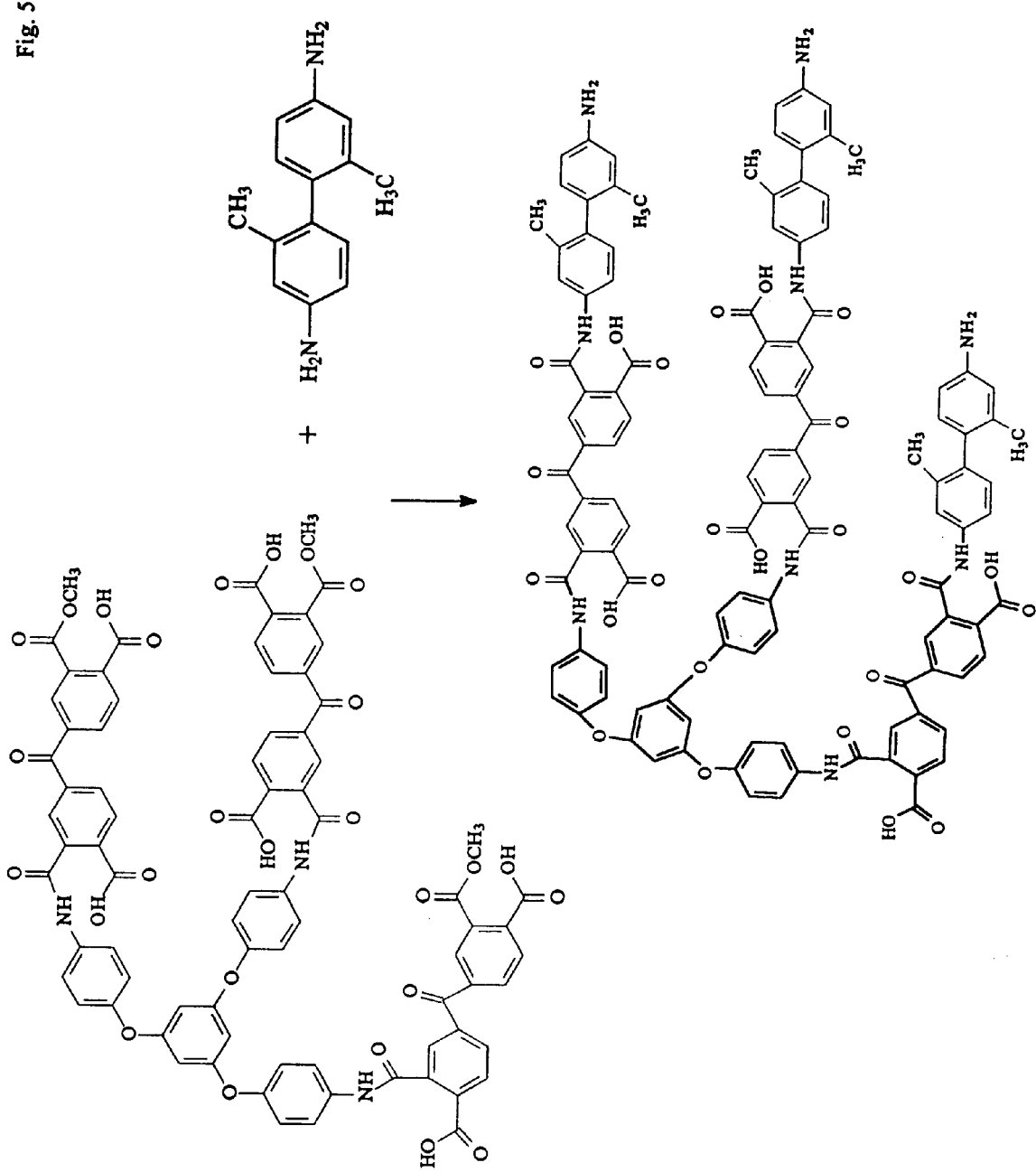
FIG. 5 is a chemical reaction scheme depicting the addition of a diamine to the reaction product of the reaction in FIG. 3.
Figure 7:
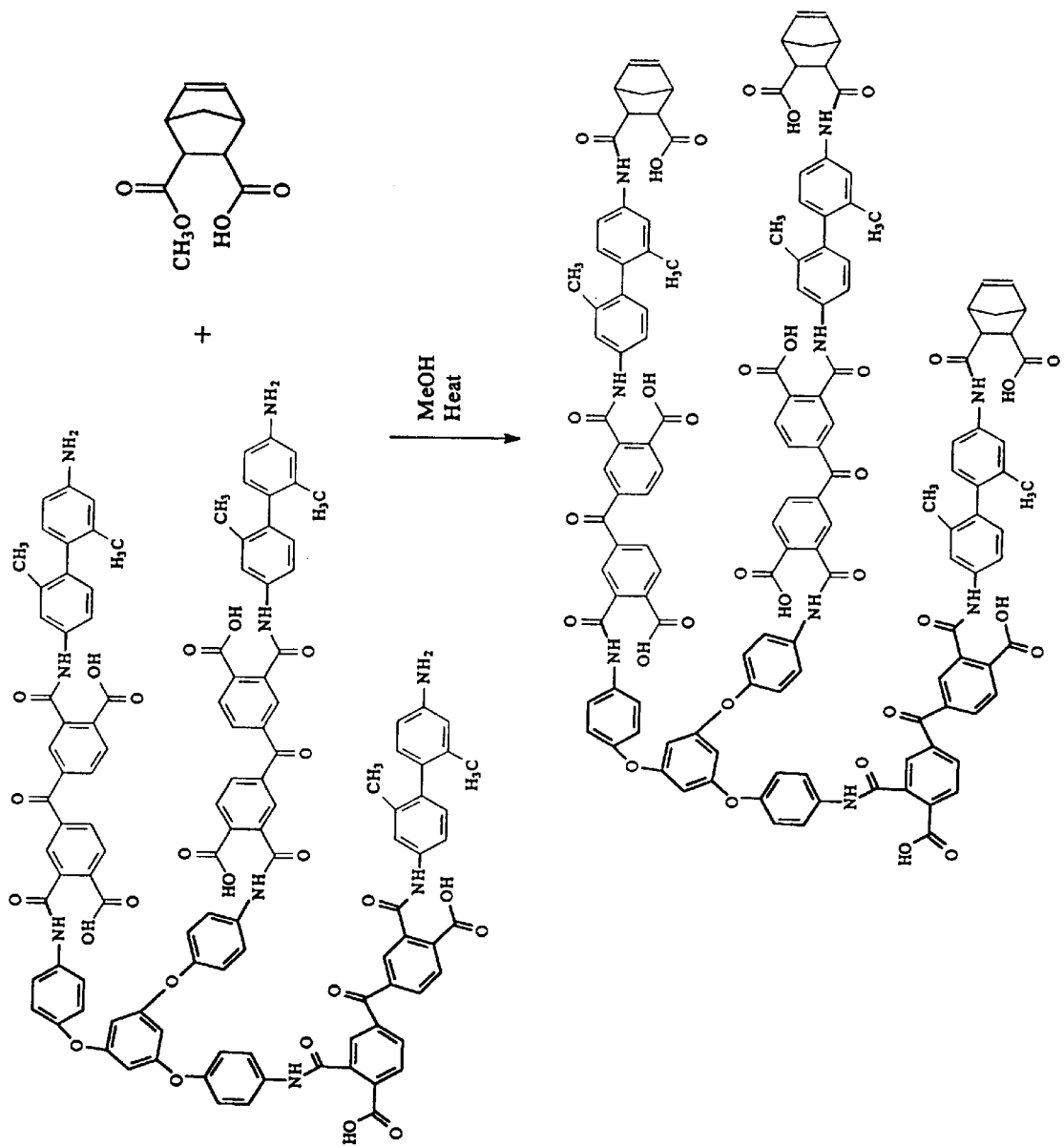
FIG. 7 is a chemical reaction scheme depicting the addition of nadic ester to the reaction products of FIGS. 5 and 6, forming a poly(amic acid)

The resultant, star-branched polyimides may be synthesized by either of two methods. The first method generates the triamine core first by dissolving triamine and the aromatic diester diacid in methanol or other low boiling alkyl alcohol, and boiling the mixture at reflux temperature for about two minutes. This reaction scheme is generally shown in FIG. 3. Diamine is then added (FIG. 5) and, after about two more minutes of stirring the boiling solution, NE or PEPA is added (FIG. 7). The alcohol solvent is then evaporated off from a hot plate until a viscous solution of poly(amic acid) is obtained. The resulting product is then imidized in an oven for about 1 hour at a suitable temperature, preferably about 204° C. (400° F.), followed by another half hour at a higher temperature, preferably about 232° C. (450° F.) (See FIG. 8).

Figure 4:
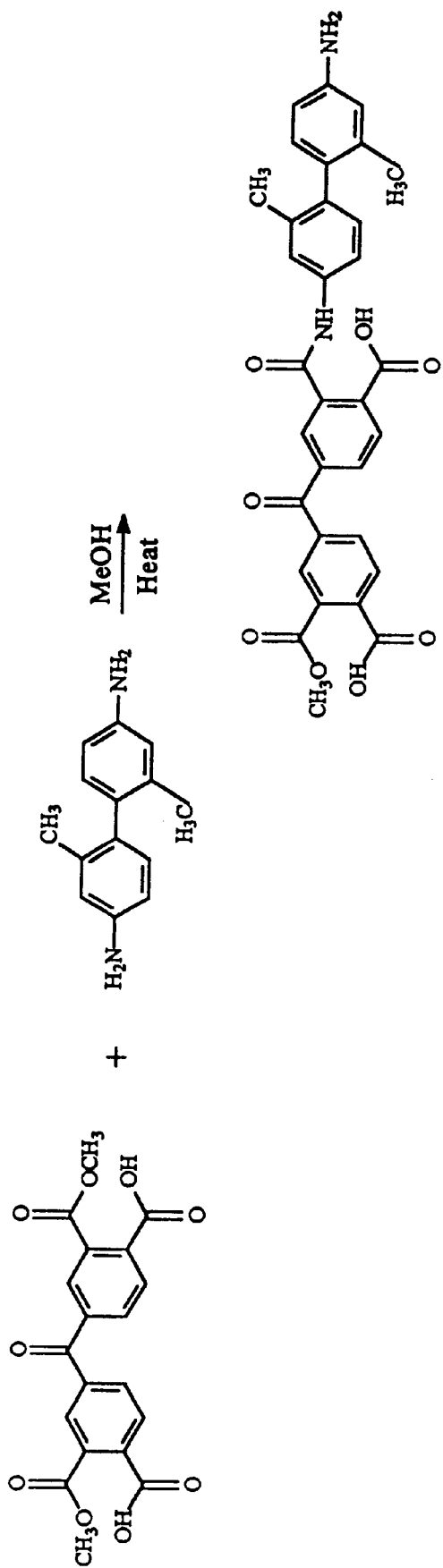
FIG. 4 is a chemical reaction scheme depicting the generation of the arms of the polyimide prepolymer star first.
Figure 6:
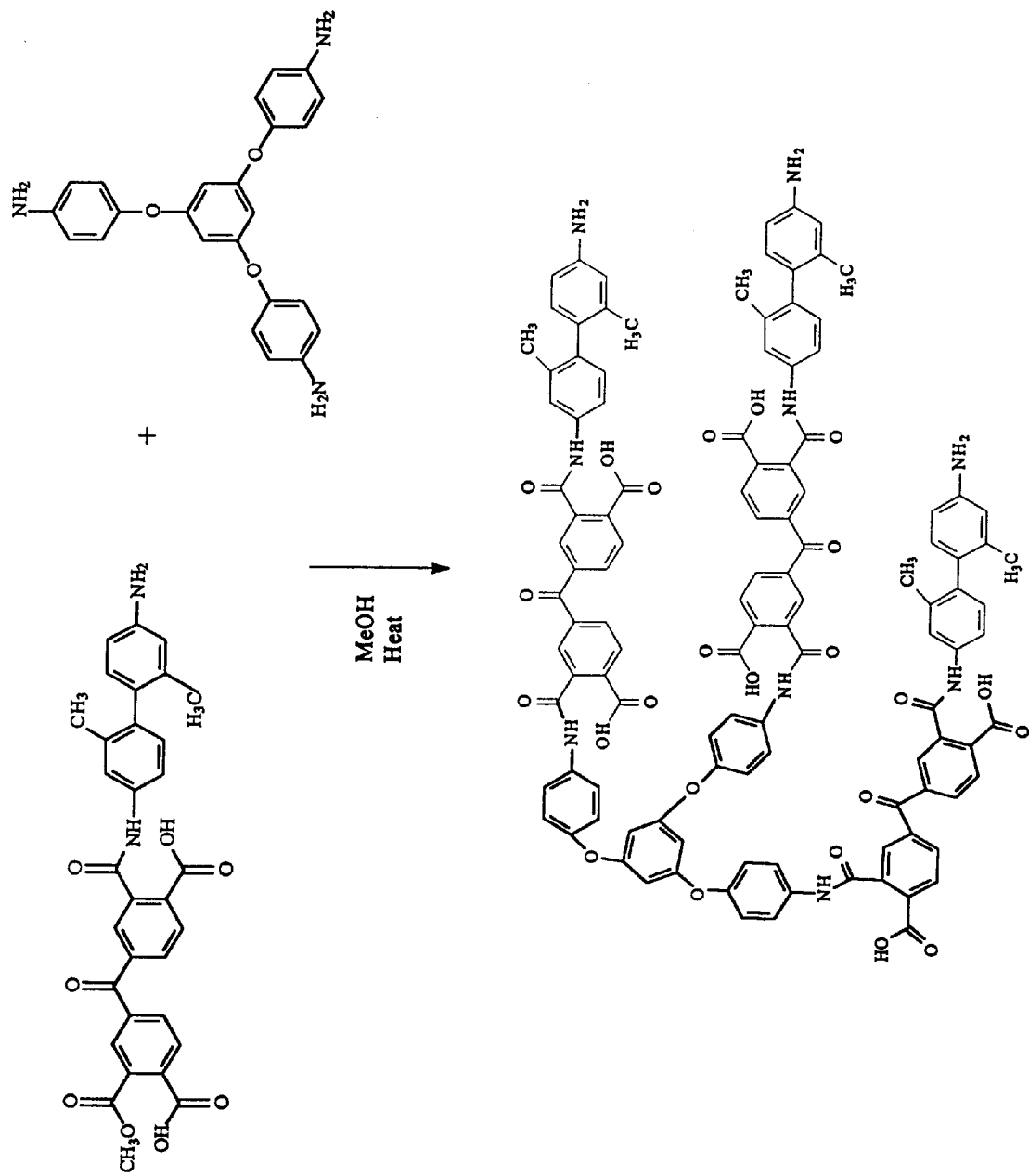
FIG. 6 is a chemical reaction scheme depicting the addition of a triamine to the reaction product of the reaction in FIG. 4.

The second method generates the arms first by stirring the diamine compound and the diester diacid together in methanol or other low alkyl alcohol for about two minutes. This reaction is more particularly shown in FIG. 4. Triamine is then added to the mixture (FIG. 6), followed by NE or PEPA (FIG. 7). The resultant poly(amic acid) resin formed from this synthesis then undergoes cyclodehydration, i.e., is imidized, in an oven for about 1 hour at a suitable temperature, preferably about 204° C. (400° F.), followed by another half hour at a higher temperature, preferably about 232° C. (450° F.) ( See FIG. 8).

Figure 8:
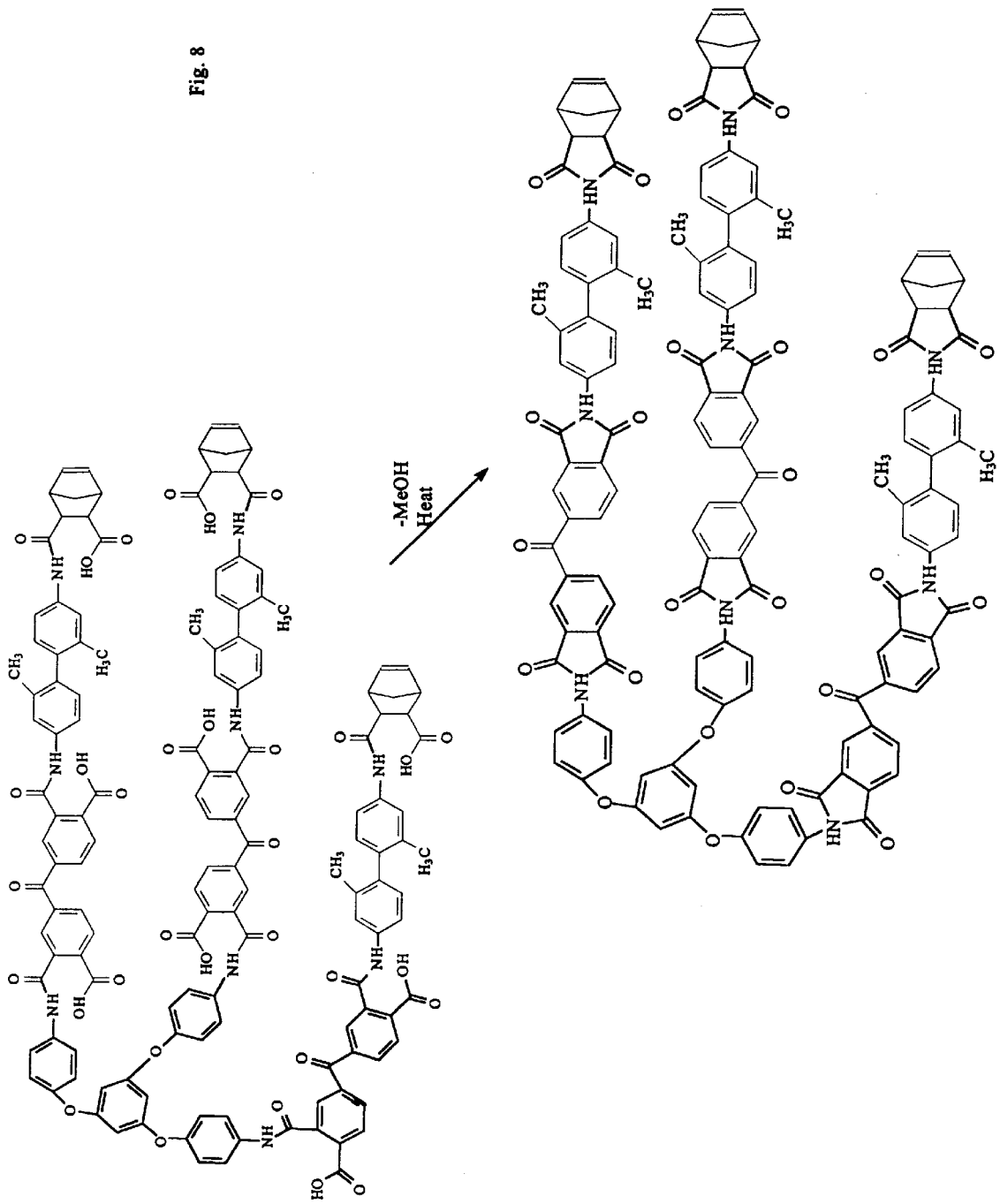
FIG. 8 is the completion of the reaction showing the cyclodehydration of poly(amic acid) to form the polyimide of the present invention.

With more particular reference to FIG. 8, the methanol or other alkyl alcohol solvent is evaporated, typically on a hot plate, until a viscous solution of amic acid is obtained. The imide is heated or "B-staged" for the time and at the temperatures noted hereinabove resulting in a polyimide precursor for a high temperature polymer matrix composite.

Figure 9:
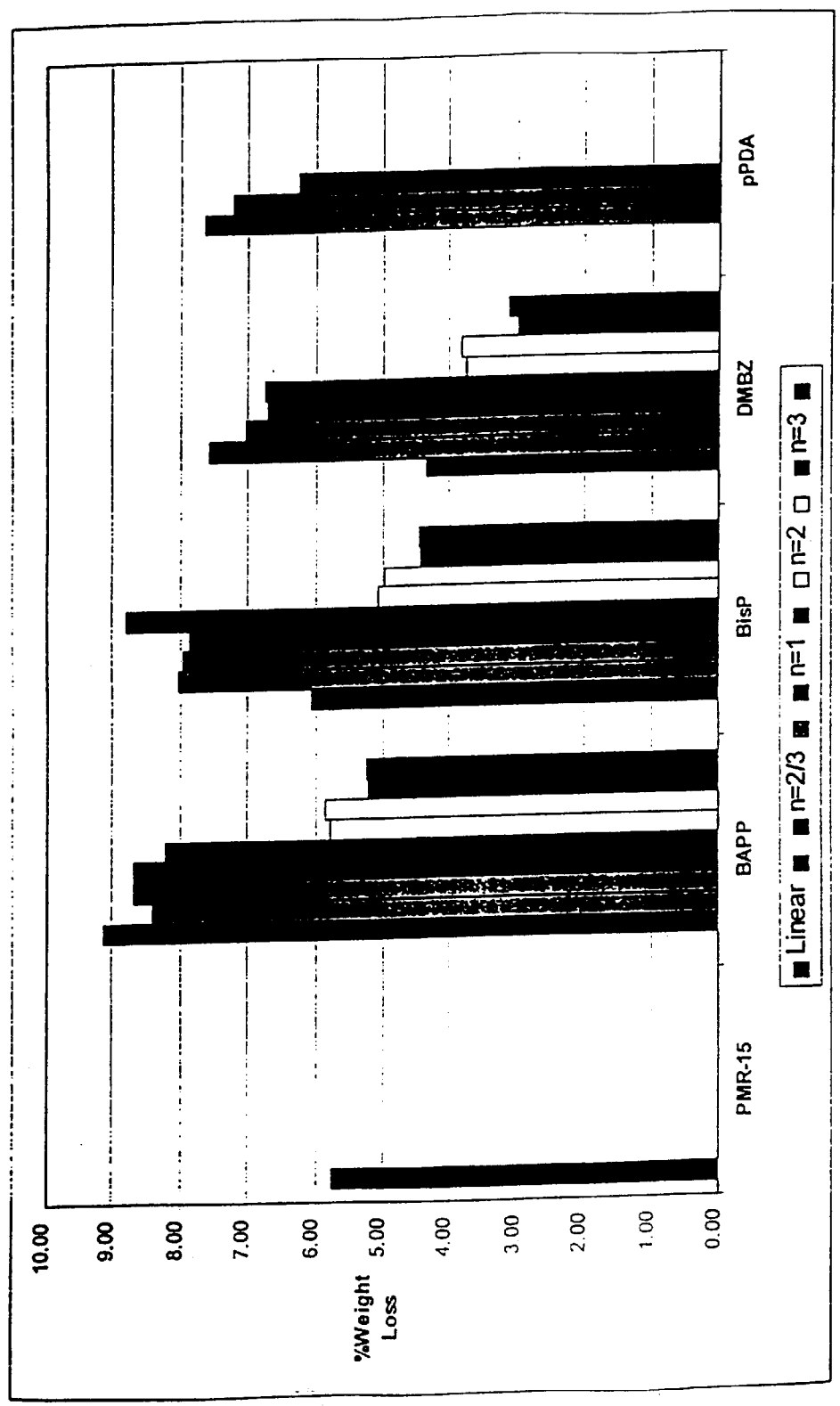
FIG. 9 is a representative bar graph of resin isothermal aging at 1000 hours at 288° C. (550° F.) for polyimides containing various diamines.

The resultant star-like polyimides exhibit lower melt flow viscosity and high glass transition temperatures as well as increased thermo-oxidative stability as compared to their "linear" counterparts of similar molecular weight. The thermal analysis results of these various branched polyimides and their linear counterparts are set forth in FIGS. 9 and 10 and in the Table herein below.

Thermal Analysis Results for Branched and Linear Polyimide

| n | Tg (TMA) | | | |
|---|---|---|---|---|
| | BAPP | Bis-P | DMBz | P-PDA |
| 2/3 | 352 | 356 | 381 | 414 |
| 1 | 339 | 357 | 405 | 425 |
| 2 | 300 | 320 | 370 | NA |
| 3 | 301 | 334 | 370 | NA |
| Linear (2) | 295 | 318 | 417 | NA |

The lower melt flow viscosity in particular provides for a substantial improvement in the processability of the resultant polyimide. As such, the resultant polyimide precursors are believed to be very useful as high performance matrix resins in advanced fiber reinforced polymer matrix composites. Preferred viscosities are well below 10,000 centipoise, and more preferably less than 1000 centipoise (1000 centipoise corresponds to a squeeze flow index of at least 230 sq. cm/g), such that resin transfer molding techniques can be used in the process of matrix composites therefrom.

With respect to FIG. 10, melt flow viscosities were estimated using a Squeeze Flow Test. In this test, powdered resin (nominally 0.5 grams) is placed between two 12 inch by 12 inch sheets of polyimide film, commercially available from DuPont under the trademark Kapton, and placed in a press that has been heated to about 288° C. Pressure (about 170 psi) is applied for about two minutes and then the Kapton/resin sample is removed from the press where it is allowed to cool to room temperature. The area of the resulting resin "blot" is measured using an image analyzer. The Squeeze Flow Index, SFI, of any given resin, measured by this technique, is calculated from this area using the equation:

SFI=Area of resin "blot" (in square cm)/Resin used (in grams)

Based upon the results of the Squeeze Flow Test on a series of silicon oils of known viscosity, a SFI value of about 230 square cm/gram corresponds to a viscosity of about 1000 centipoise. As noted above, for resin transfer molding, it is desirable to have resins with SFI values of at least 230 sq. cm/g.

Data presented in FIG. 10 represents optimized formulations and staging conditions (time and temperature at which the resin powders were treated before processing) for a family of polyimides prepared with 2,2'-dimethylbenzidine (DMBZ), Bisaniline P (Bis-P), or combinations of the two. Percent DMBZ refers to the percentage of 2,2'-dimethylbenzidine in the diamine mixture. Hence, 100% DMBZ refers to a resin that is made from 100% DMBZ and 0% Bis-P. A resin made with 0% DMBZ has only the Bis-P diamine.

Polymer resins in FIG. 10 were optimized for maximum squeeze flow index (SFI), Tg, or lowest weight loss. For example, the maximum SFI for this polymer matrix can be attained using the formulation shown in FIG. 1 with resins prepared from 4.63 percent triamine so that X=0.0463, a diamine containing 99.35 percent Bisaniline P and 0.65 percent 2,2-dimethylbenzidine to provide 100 percent diamine, and a formulated molecular weight of 1531 g/mole.

Production of high temperature polymer matrix composites from polyimide prepolymers are well known in the art. However, due to the extremely high viscosity of the PMR-type polyimides, molding techniques were limited and extremely costly. However, with the advance of the polyimides of the present invention, it is believed that the subject addition-cured polyimides can be processed using resin transfer molding techniques.

Thus it should be evident that the polyimides, methods for the synthesis thereof and polymer matrix composited formed therefrom, of the present invention are highly effective for their desired use. The invention is particularly suited for PMR-type polyimides, but is not necessarily limited thereto. The polyimides and method of the present invention can be used separately for purposes other than those set forth herein, as well as for the manufacture of other materials requiring polyimides.

Based upon the foregoing disclosure, it should now be apparent that the use of the invention as described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, aromatic diamines and triamines set forth in the specification are not necessarily limited to those set forth, it being understood that the examples set forth or preferred modes or for illustration purposes only. Moreover, as noted hereinabove, other nadic end groups can be substituted for the nadic ester disclosed. Thus, the scope of the invention shall include all modifications and variations that may fall within the scope of the attached claims.

What is claimed is:

1. An addition-cured polyimide, suitable for use in resin transfer molding, comprising the reaction product of an aromatic triamine represented by the following chemical structure:

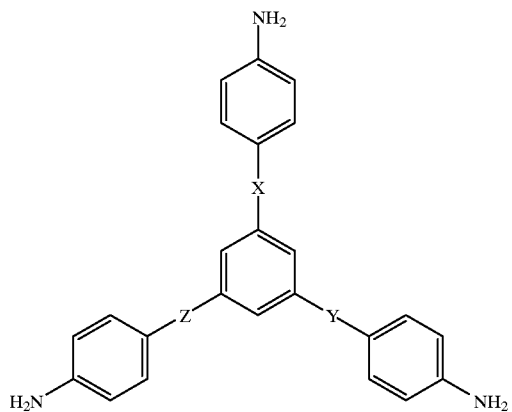

wherein X, Y, and Z are the same or different and are selected from the group consisting of nil, O, $CH_2$, and C=O, or a trianhydride analogue thereof;

a reactive end group selected from the group consisting of 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride;

an aromatic diamine; and a dialkyl ester of an aromatic tetracarboxylic acid.

2. The addition-cured polyimide of claim 1, comprising n moles of the dialkyl ester of an aromatic tetracarboxylic acid; 2/3X(n+1) moles of the aromatic triamine; (1−X)(n+1) moles of the aromatic diamine; and 2 moles of the reactive end group, wherein X is the percentage of triamine employed, and n is a selected number of repeating monomer units of the monomer reactants.

3. The addition-cured polyimide of claim 1, comprising 3n moles of the dialkyl ester of an aromatic tetracarboxylic acid; 1 mole of the aromatic triamine; 3n moles of the aromatic diamine; and 3 moles of the reactive end group, wherein n is a selected number of repeating monomer units of the monomer reactants.

4. The addition-cured polyimide of claim 1, wherein the aromatic triamine is selected from the group consisting of α,α',α"-tris(4-aminophenyl) mesitylene, 1,3,5-tris(4-aminobenzoyl) benzene, 1,3,5-tris(4-aminophenyl) benzene, and 1,3,5-tris(4-aminophenoxy) benzene.

5. The addition-cured polyimide of claim 1, wherein the dialkyl ester of an aromatic tetracarboxylic acid is the dimethyl ester of 3,3',4,4'-benzophenonetetracarboxylic acid.

6. The addition-cured polyimide of claim 1, wherein the aromatic diamine is selected from the group consisting of 2,2'-dimethylbenzidine, 2,2'-Bis(4-aminophenoxy) propane, α,α'-Bis(4-aminophenyl) p-xylene, Bisaniline P, and p-phenylene diamine.

7. The addition-cured polyimide of claim 1, wherein the reactive end group is the monomethyl ester of 5-norbornene-2,3-dicarboxylic acid.

8. The addition-cured polyimide of claim 1, wherein the reactive end group is a mixture of reactive and unreactive end groups.

9. The addition-cured polyimide of claim 8, wherein the unreactive end group is selected from the group consisting of monoalkylester derivatives of aromatic ortho- diacids and anhydride derivatives of aromatic ortho-diacids.

10. A method for the synthesis of an addition-cured polyimide comprising the steps of
dissolving an aromatic triamine represented by the following chemical structure:

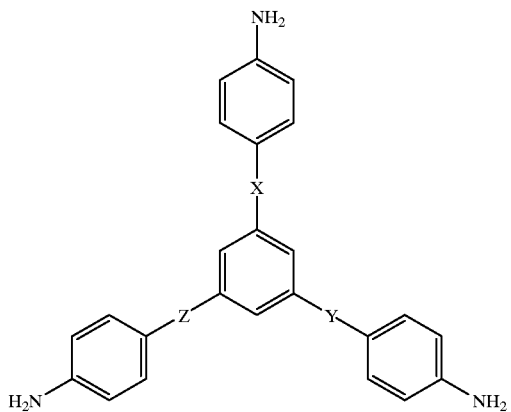

wherein X, Y, and Z are the same or different and are selected from the group consisting of nil, O, CH$_2$, and C=O, ortrianhydride analogue thereof, a dialkyl ester of an aromatic tetracarboxylic acid, an aromatic diamine, and a reactive end group selected from the group consisting of 5-norbornene-2,3-dicarboxylic acid, ester derivatives of 5-norbornene-2,3-dicarboxylic acid, anhydride derivatives of 5-norbornene-2,3-dicarboxylic acid, and 4-phenylethynylphthalic anhydride, in a low-boiling alkyl alcohol solvent to form a viscous solution of a poly(amic acid);

evaporating the alcohol solvent; and imidizing the poly(amic acid) with heat.

11. The method of claim 10, wherein the aromatic triamine is selected from the group consisting of α,α',α"-tris(4-aminophenyl) mesitylene, 1,3,5-tris(4-aminobenzoyl) benzene, 1,3,5-tris(4-aminophenyl) benzene, and 1,3,5-tris(4-aminophenoxy) benzene.

12. The method of claim 10, wherein the dialkyl ester of an aromatic tetracarboxylic acid is the dimethyl ester of 3,3',4,4'-benzophenonetetracarboxylic acid.

13. The method of claim 10, wherein the aromatic diamine is selected from the group consisting of 2,2'-dimethylbenzidine, 2,2'-Bis(4-aminophenoxy) propane, α,α'-Bis(4-aminophenyl) p-xylene, Bisaniline P, and p-phenylene diamine.

14. The method of claim 10, wherein the reactive end group is the monomethyl ester of 5-norbornene-2,3-dicarboxylic acid.

15. The method of claim 10, wherein the step of dissolving further comprises
dissolving the aromatic triamine and the dialkyl ester of an aromatic tetracarboxylic acid in a low-boiling alkyl alcohol solvent;

stirring in the aromatic diamine; and adding the reactive end group.

16. The method of claim 10, wherein the step of dissolving further comprises
stirring the diamine and the dialkyl ester of an aromatic tetracarboxylic acid together in a low-boiling alkyl alcohol solvent;

adding the aromatic triamine; and adding the reactive end group.

17. A polymer matrix composite comprising a star-branched, addition-cured polyimide prepared using resin transfer molding techniques.

* * * * *